Jan. 10, 1939.  A. E. MATHEY  2,143,706
AUDIBLE SIGNALING MEANS
Filed June 23, 1937  2 Sheets-Sheet 1
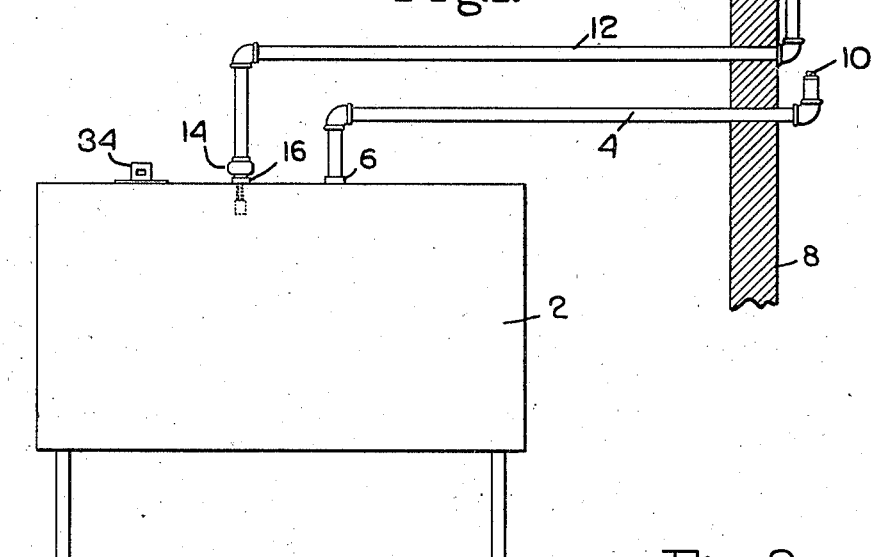
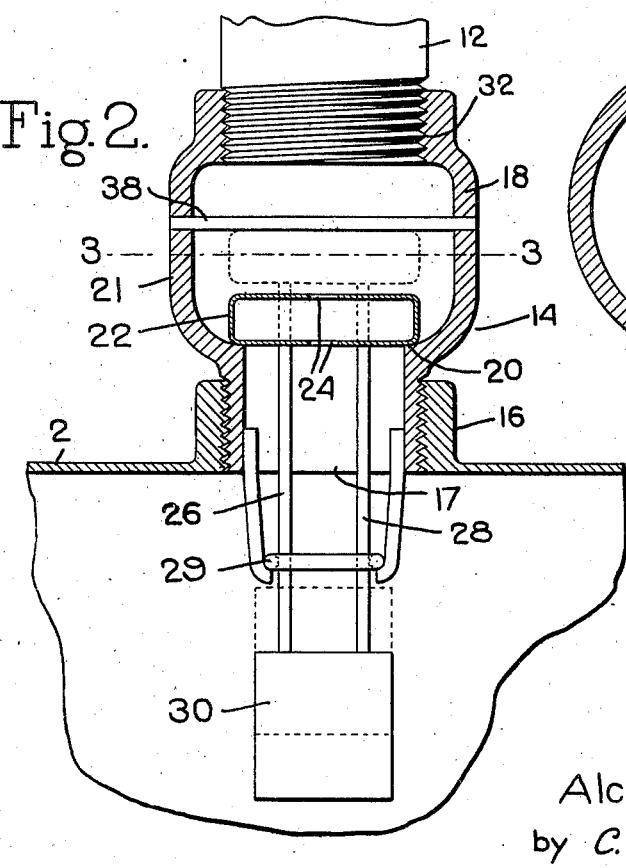
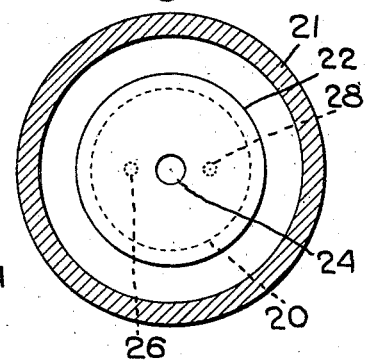
Inventor.
Alcide E. Mathey
by C. Yardley Chittick
Atty.

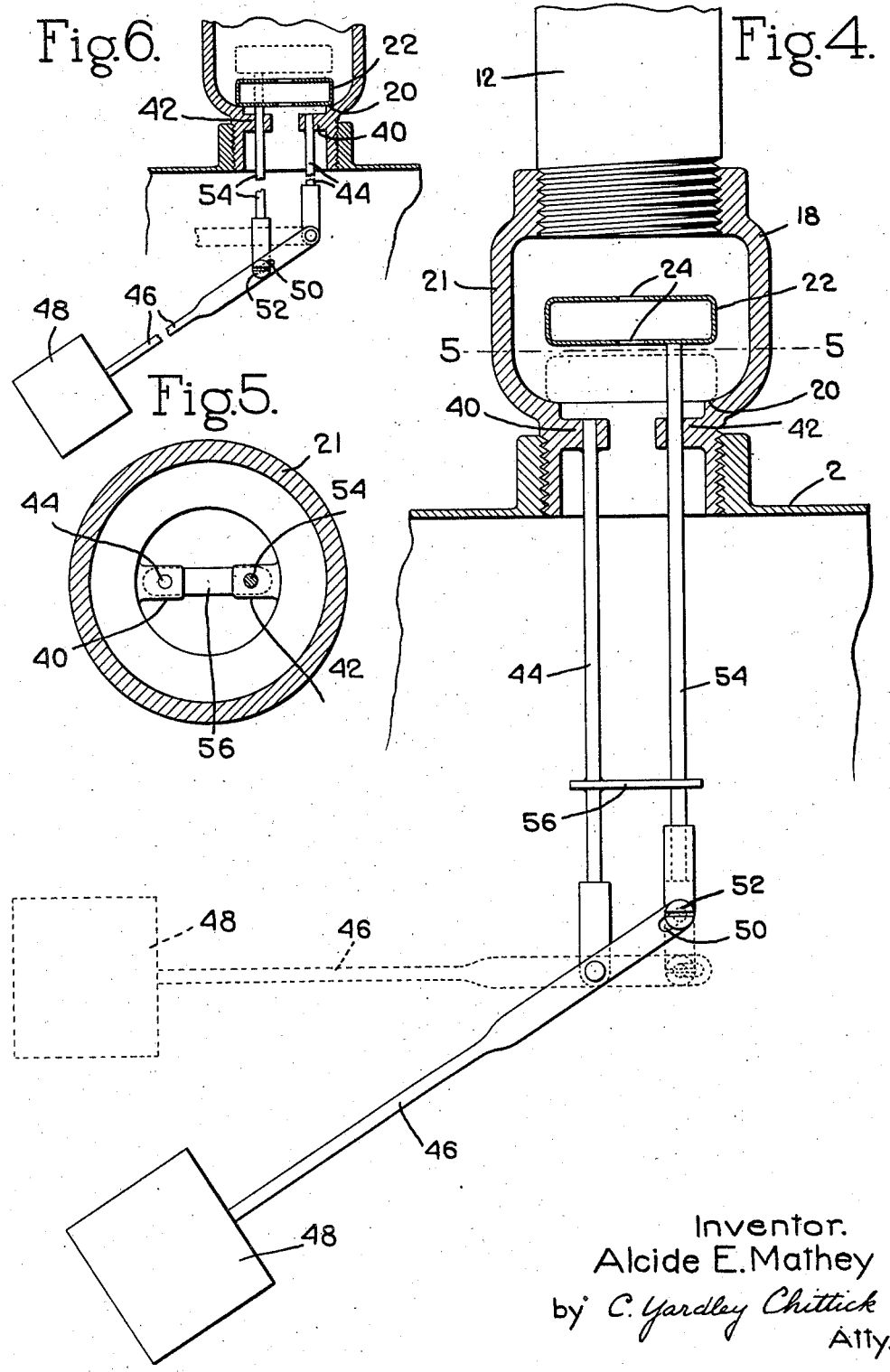

Patented Jan. 10, 1939

2,143,706

UNITED STATES PATENT OFFICE 2,143,706

AUDIBLE SIGNALING MEANS

Alcide E. Mathey, Newton, Mass., assignor to Scully Signal Company, Cambridge, Mass., a corporation of Massachusetts Application June 23, 1937, Serial No. 149,902

17 Claims. (Cl. 137—111)

This invention relates to means for indicating the level of liquid in a tank.

When filling a closed tank with liquid, particularly those tanks in which the liquid passes to the tank through a filler pipe or through a small opening in the upper portion of the tank, it is often difficult for the person in charge of the filling operation to know when the tank is filled to the desired level. Again, it often happens that the operator in charge is remote from the tank and has no way of knowing when the tank is filled other than by shutting off the supply and personally determining the level of the fluid, which is a time-consuming operation and undesirable. Even where gauges are provided on tanks it is often impossible for the operator controlling the filling thereof to see the gauge and hence the tank may be over or under filled.

One of the objects of my invention, therefore, is to provide an audible signaling means which will indicate to the operator when the liquid in the tank has reached a predetermined level.

Another object of my invention is to provide an audible signaling means which may be used with a closed tank of any type in which the air or gas is vented therefrom through a vent pipe or other similar relatively restricted opening.

I am aware that audible signaling means for indicating when the liquid in a tank has reached a predetermined level have been used heretofore, but my device, by its simplicity and low cost and by its novel means of operation and its adaptability for use in all types of closed tanks, is believed to constitute a distinct advance over the prior art.

Other objects of my invention will become apparent as the description proceeds with the aid of the accompanying drawings, in which:

Fig. 1 shows a typical liquid-containing tank having filling and venting means therefor incorporating my signaling device;

Fig. 2 is a cross sectional detail of my signaling means;

Fig. 3 is a cross sectional view on the line 3—3 of Fig. 2.

Fig. 4 is a cross sectional elevation of a modified form;

Fig. 5 is a section on the line 5—5 of Fig. 4.

Fig. 6 is a fragmentary cross sectional elevation of another modification.

In Fig. 1, 2 is a tank adapted to hold liquids of any type. A filler pipe 4 is connected with tank 2 at 6. In this case the pipe 4 extends through the wall 8 of the building and has on its outer end a cap 10, which may be removed when it is desired to fill the tank.

Obviously, as the liquid enters the tank, means must be provided for the escape of the confined air or gas and this is accomplished by the vent pipe 12, which in this showing, has its open end on the opposite side of the wall 8 in proximity to the end of the filler pipe 4.

The numeral 14 designates generally my signaling means and this is shown in detail in Fig. 2. It will be noted that my unit is positioned in the venting line. Referring to Fig. 2, a flange 16 is provided at the vent opening 17 of tank 2. Into this flange, which is threaded internally, is screwed a threaded sleeve 18 expanding from the small neck portion 20 into the enlarged portion 21. The restricted neck portion 20 forms a seat against which is positioned a hollow cylindrical member 22, closed at the top and bottom except for a small central hole 24.

This member 22, the proportions of which may be varied as desired, constitutes a whistle or signaling means and is so designed to give forth audible sounds when air or other gas is passed through it under a wide range of pressures. Depending from the whistle 22 are connecting means in the form of bars 26 and 28, guided by rinig 29, which carry on their lower ends a float 30 which may be of cork or a hollow sealed metal member or any other form. The float must be sufficiently buoyant to be able to raise the bars 26 and 28 and the whistle 22 when rising liquid causes the float 30 to move upwardly.

The vent pipe 12 is connected to sleeve 18 by the threads 32. Since vent pipe 12 is the only passage through which air or other gas may escape from the tank, it follows that when the tank is being filled with liquid entering through pipe 4, the air in the tank will be under slight pressure and will pass out to the atmosphere through the whistle 22 and the vent pipe 12. Since, as above stated, this whistle operates through a wide range of pressures, the pressure that is at once set up in the tank because of the entering liquid is sufficient to cause whistling sounds of ample intensity to be heard at the outer end of the vent pipe. Thus, from the time liquid starts to enter the tank a whistling sound will be heard continuously at the vent pipe until the liquid rises to the level of float 30. On arriving at this point float 30 will ascend with the rising level to raise whistle 22 off its seat 20, thus permitting the air to escape from the tank by passing around the whistle 22 as well as passing through the centre hole 24. As soon as whistle 22 is raised from seat 20 the change in the passage of air causes the whistle either to cease giving forth an audible sound or materially alters the pitch or intensity, depending on the type of whistle used. When this happens the operator in charge of filling the tank knows at once that the liquid level has reached float 30, which, of course, is hung a predetermined distance below the top of the tank. Having been advised by the cessation or modification of the whistling that the tank is filled to the desired level the operator then cuts off the supply of liquid.

A stop in the form of a bar 38 is provided in sleeve 18. This is for the purpose of preventing excessive upward movement of whistle 22. If upward movement of whistle 22 were not in some way restrained, the whistle might reach a position adjacent the end of pipe 12 to substantially restrict the venting capacity, thereby setting up a dangerous condition.

Whistle 22 can be moved off its seat either by excessive gas or vapor pressure or by the action of the liquid level on float 30.

When the pressure of the escaping gas is slight all of it passes through holes 24 of whistle 22. When the upward pressure against the lower side of whistle 22 exceeds the weight of the whistle and its connected parts, the whistle will be raised slightly off seat 20, to by-pass gas around the whistle. A condition of equilibrium will then be set up with the whistle floating on the gases escaping from vent 17. The pressure on the top of the whistle will be less than that on the bottom, hence gas will flow through holes 24 and the whistling will continue. Thus whether whistle 22 be resting on seat 20, which is the case when gas is being vented at a low rate, or raised from the seat and floating in the gas stream, which is the case when the rate of escape is greater, the whistle will be operative to produce an audible sound.

If, on the other hand, the whistle is raised from seat 20 by the upward movement of float 30 at a time when the gas pressure is insufficient to disturb the whistle's position but sufficient to operate the whistle, the opening created between the whistle and seat 20 will be sufficient to offer a substantially free passage to the escaping gases, with the result that the pressures on both sides of the whistle become substantially equal, whereupon the whistling will cease.

In like manner, the whistle, operative while floating in the gas stream, will become inoperative when it is raised above its position of equilibrium by the positive action of the float 30 as the latter is affected by the rising level of the liquid. This is because the passage created between the whistle 22 and enlarged portion 21 is sufficient to allow substantially unimpeded passage of the gas, thereby eliminating the pressure differences that are responsible for the whistling. It is unnecessary that whistle 22 be raised to a position against stop 38 before whistling ceases. It is merely necessary to create a sufficient opening between the whistle and seat 20 to eliminate the pressure differences.

The provision of stop 38 makes it impossible for whistle 22 to block pipe 12 should the whistle be driven upwardly by overflowing oil. The passage between whistle 22 and enlarged portion 21 is as great as the passage through vent 17 or the pipe 12. Hence my device, when operating either as a vent for gases or overflowing liquids, does not affect the safety of the tank in any way.

When the whistling ceases due to the upward movement of whistle 22 caused in turn by the raising of float 30, the operator will stop the filling operation. By my signalling means, it is possible for the operator to be at a point remote from the tank as the whistling sound will carry for a substantial distance either directly or through the vent pipe.

Another advantage of my construction is that the operator may determine, prior to filling the tank, and without the necessity of inspecting gauge 34, whether or not the liquid level in the tank is below float 30 by merely blowing into the end of the filler pipe 4. This will create a slight pressure in the tank and if whistle 22 is positioned on seat 20 a whistling sound will immediately emanate from the vent pipe 12. If this is the case the operator will know that aditional liquid may be added to the tank. On the other hand if the liquid level is so high that float 30 has raised whistle 22 off seat 20 then when the operator blows into filler pipe 4 no whistling sound will be heard.

When the liquid level falls, float 30 will descend carrying with it whistle 22 which will automatically reseat itself on seat 20 and will thus be ready to advise the operator any time thereafter.

It is believed clear from the foregoing that my device can be used on any tank where the displaced air or gas can be directed to pass through whistle 22. The vent pipe used in conjunction therewith may be of any suitable length. In general, however, it is desirable that the end of the vent pipe be within a reasonable distance of the operator so that he may more readily hear the whistle.

While I have shown my device in combination with one particular type of tank structure, it is obvious, as stated above, that it may be used in any arrangement where the rate of fill or expansion of the gases causes the air or gas to be expelled at a rate great enough to operate a whistle when the latter is positioned to obstruct the flow to a sufficient degree.

My whistle and connected parts may be positioned any place in the vent, provided, however, that the float 30 is so located that it will be moved by the liquid when the latter mounts to the desired level.

A modified form of my invention is shown in Figs. 4 and 5. In this construction, whistle 22 is normally inoperative while the tank is being filled and whistles only when the liquid level has risen to the desired point.

Referring to Fig. 4 the sleeve 18 is modified from that shown in Fig. 2 to the extent that there extends inwardly from the lower neck of the sleeve two bosses 40 and 42. Secured to and extending downwardly from boss 40 is a supporting rod 44 on the lower end of which is pivoted a lever 46. This lever has in one end a slot 50 in which is positioned a pin 52 associated with the lower end of a slidable rod 54. Rod 54 is maintained in position by sliding engagement with guide 56 which is carried by rod 44. The upper end of rod 54 slidably extends through boss 42 and carries on its upper end whistle 22 as shown.

When the tank is empty the parts will be as shown in solid lines in Fig. 4 but when the liquid level rises sufficiently float 48 will be carried upwardly to the position shown by the dotted lines and whistle 22 will be positioned against seat 20. In this position the escaping gas will be forced to pass through holes 24 and whistling will take place. In this way as soon as the operator hears the whistle he will know that the tank is filled.

When the whistle is in the position shown in Fig. 4 no whistling will be heard because the area about the whistle 22 is sufficient to permit free passage of escaping gas without the development of sufficient pressure differences on the opposite faces of the whistle to cause the production of sound.

If the operator should inadvertently fail to shut off the supply of liquid my construction is such that no restriction of the normal overflow capacity will take place. As the oil reaches the whistle 22 when it is seated on seat 20 the upward pressure against the bottom of the whistle will be sufficiently great to force the whistle to the position shown in Fig. 4 and, when the whistle is so located, overflow oil may readily escape by passing around it. The resistance offered by whistle 22 to the upwardly flowing oil is determined by the buoyancy of float 48. I have arranged my float so that it is but slightly buoyant with the result that a very slight upward pressure against whistle 22 is sufficient to move the float downwardly from the position shown by the dotted lines to the position shown by the solid lines.

Likewise if the liquid level has raised the float 48 to the position of the dotted lines and there should thereafter be a heavy discharge of gas the upward pressure of the gas against the bottom of whistle 22 will be sufficient to force the whistle upwardly and immerse the float 48 in the liquid, thus providing sufficient venting capacity.

Thus it can be seen that the modified construction of Fig. 4 in no way impedes the safety features provided by a normal vent and at the same time supplies a signaling device which is silent through the major part of the filling operation.

Where the form shown in Fig. 4 is used the operator may determine whether or not fluid is required in the tank by blowing into the fill pipe. If no whistle is heard it is apparent that the level must be below the float 48. If, however, a whistle is heard then the operator will know that the tank is filled.

While Fig. 4 shows a lever of the first class it is apparent that a lever of the second could be used with equal effectiveness. Such construction is shown in Fig. 6 in which the parts similar to those in Fig. 4 have been correspondingly numbered. When this arrangement is used the whistle 22 rests on seat 20 when the oil or liquid is below the desired level, and whistling takes place throughout the filling operation. As float 48 is raised by the rising liquid, whistle 22 is raised from the seat and the whistling ceases.

To use a lever of the first or second class is a matter of choice, determined by whether it is preferred to have the whistle operated during the filling operation or vice versa.

While I have shown and described preferred forms of my invention I wish it to be distinctly understood that I do not intend to be limited thereby but only by the appended claims.

I claim:

1. In combination, a tank having a vent, a gas operated sound producing device positioned in said vent, and buoyant means for automatically displacing said device when liquid in said tank rises to a predetermined level.

2. In combination, a tank having a vent, a gas operated sound producing device positioned in said vent to restrict the effective area of said vent, and means operated by a rising liquid level in said tank to move said device from its original position whereby the effective area of said vent will be increased.

3. In combination, a tank having means for permitting the escape of gases when liquid is added thereto, a gas operated sound producing device positioned in the path of said escaping gases so that said device will be operative and means operated by the rising liquid for moving said device to a position in the path of said escaping gases in which said device will be inoperative.

4. In combination, a tank having a vent including a restricted portion to form a seat, a sound producing device resting against said seat and partially blocking said vent, means operable under the influence of a rising liquid level in said tank to move said device away from said seat to increase the effective venting area.

5. In combination, a tank having a vent extending upwardly therefrom, an inwardly extending shoulder forming a seat in said vent, a whistle resting on said seat whereby said whistle will be operated by gases passing through said vent, a float within said tank connected with said whistle whereby when said float is raised by rising liquid in sand tank, said whistle will be moved away from said seat to permit passage of gases around said whistle.

6. A signaling device for use in tanks comprising a sleeve having a circumferentially internally extending shoulder, a whistle adapted to rest against said shoulder thereby reducing the effective area within said shoulder, and a float connected with said whistle of sufficient buoyancy to move said whistle away from said shoulder.

7. In combination a tank having a vent, a gas operated sound producing device movably positioned at and restricting said vent, buoyant means connected to said device, said device adapted to be moved by gas pressure in excess of a predetermined amount or by said buoyant means as the liquid level rises, to a position where said vent will be less restricted.

8. In combination, a tank having a vent and a vent pipe connected therewith, said pipe of varying cross sectional area, a gas operated sound producing device normally positioned in said pipe at a restricted section and means for moving said device under the influence of tank pressures above a predetermined amount to a less restricted section, thereby increasing the effective venting area, and liquid operated means for moving said device to a less restricted section when the liquid level rises to a predetermined point.

9. In combination, a tank having a vent of varying cross-section, a whistle normally positioned in said vent at a restricted cross section, means for automatically moving said whistle to other positions at less restricted cross sections as the liquid level rises or the pressure increases beyond predetermined points in said tank, and stop means for stopping the movement of said whistle at the section of substantially the greatest effective venting area.

10. In combination, a tank having a vent, a gas operated sound producing device positioned at and restricting said vent, means operated by tank pressures above a predetermined point for increasing the effective area of said vent by moving said device away from its normal position, the amount of movement varying with the pressure, and means controlled by liquid in said tank for moving said device to a less restricted area when the liquid rises to a predetermined point.

11. In combination a tank having a vent open at all times regardless of the liquid level therein, a gas operated sound producing device positioned in said vent, and means operated by a rising liquid level in said tank for varying the effective venting area.

12. In combination, a tank having a vent, a gas operated sound producing device positioned in said vent, and means including a float operated by the liquid level in said tank for rendering said device audible or inaudible while gas is flowing through said vent.

13. In combination, a tank having a vent with a variable cross sectional area, an audible signaling device positioned at a restricted section of said vent immediately below a larger section, means associated with said device extending into said tank and adapted to be moved by a rising liquid level, and other means for preventing restriction of said vent by said device or means when said device or means is moved upwardly.

14. In combination, a tank having a vent and an audible signaling device, said device comprising a sleeve, a whistle, movable under the influence of a rising liquid level or increasing pressure in said tank, positioned within said sleeve, and means for limiting the movement of said whistle in said sleeve toward and away from said tank.

15. A signaling device for use in tanks, comprising a sleeve having a varying internal diameter, a gas-operated, sound-producing device positioned within said sleeve and movable to vary the effective area within said sleeve, and buoyant means connected to said device to move the latter within said sleeve.

16. A signaling device for use in tanks, comprising a sleeve, a gas-operated, sound-producing device positioned within said sleeve and movable to vary the effective area within said sleeve, and buoyant means connected to said device to move the latter within said sleeve.

17. A signaling device for use in tanks, comprising a sleeve, a gas-operated, sound-producing device positioned within said sleeve and movable to vary the effective area within said sleeve under the influence of gases of sufficient velocity passing through said sleeve, and positive stop means for limiting the movement of said device in said sleeve in one direction at a point of predetermined effective area, and other positive stop means for limiting the movement of said device in said sleeve in the opposite direction at a point of greater effective area.

ALCIDE E. MATHEY.